March 5, 1963
J. J. BYBERG
3,079,616
FOLDABLE FLOATING PLATFORM
Filed Aug. 1, 1960
2 Sheets-Sheet 1
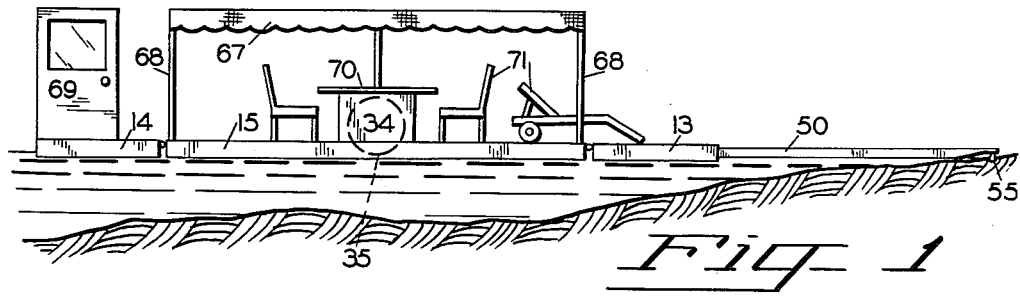
Fig. 1
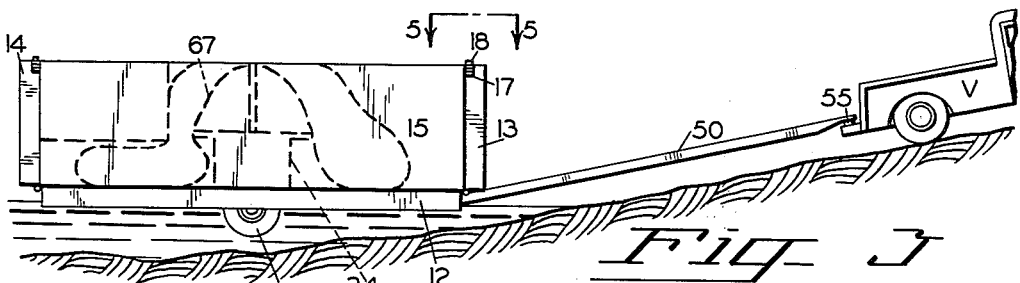
Fig. 3
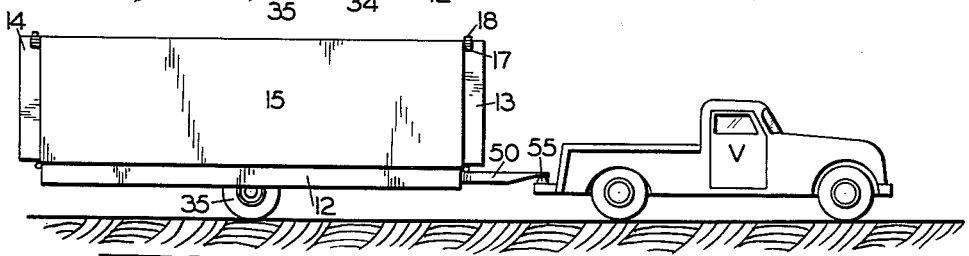
Fig. 4
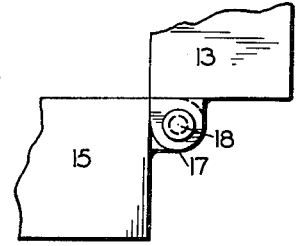
Fig. 5
Fig. 2
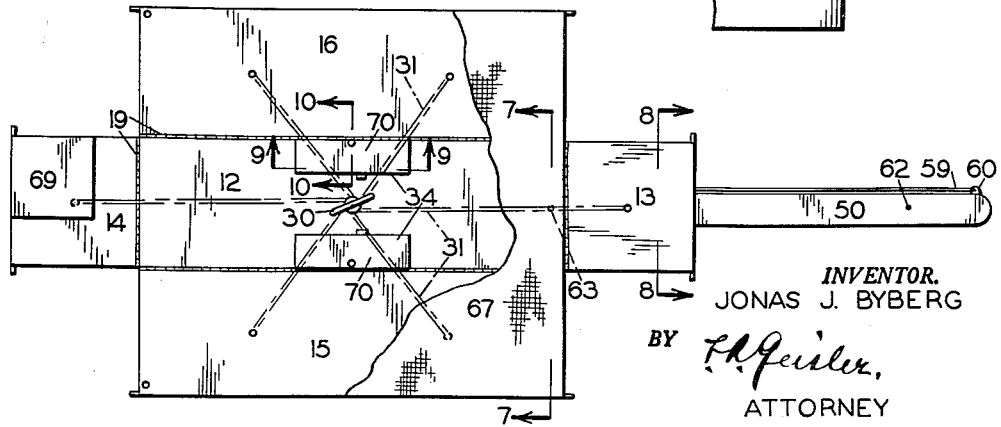
INVENTOR.
JONAS J. BYBERG
BY
ATTORNEY March 5, 1963   J. J. BYBERG   3,079,616
FOLDABLE FLOATING PLATFORM
Filed Aug. 1, 1960   2 Sheets-Sheet 2
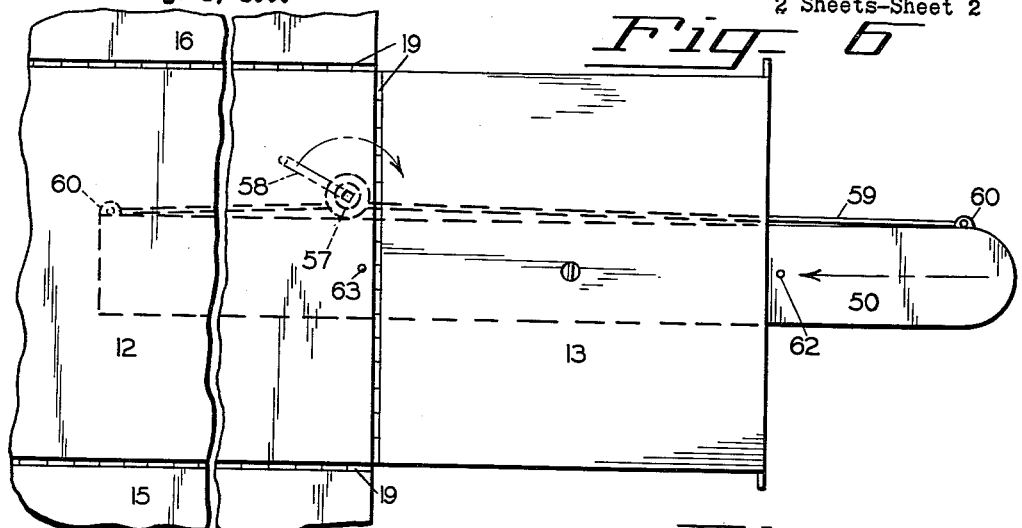
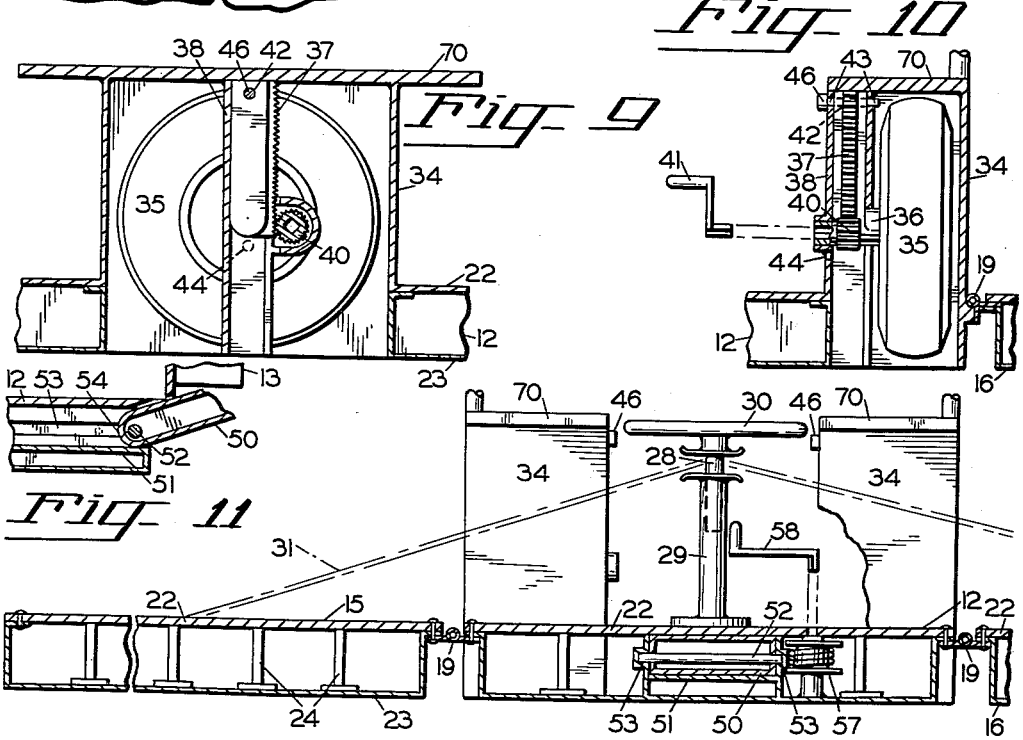
INVENTOR.
JONAS J. BYBERG
BY T. R. Geisler,
ATTORNEY 3,079,616
FOLDABLE FLOATING PLATFORM
Jonas J. Byberg, 511 N. Water St., Silverton, Oreg.
Filed Aug. 1, 1960, Ser. No. 46,588
1 Claim. (Cl. 9—1)

This invention relates to a floating deck or platform to be used for recreational purposes as well as serving for a temporary docking for small boats.

Heretofore floating decks or platforms, or even small moorage docks, have generally been of such construction as to be too heavy for practical transportation out of the water as well as being costly, and furthermore have not been usable in shallow water.

An object of the present invention is to provide a novel, practical and relatively inexpensive floating platform which, although lacking in over-all, self-sustaining stiffness or rigidity, nevertheless will be so constructed that the distribution of weight over large displacement area will enable its buoyancy in the water to furnish the necessary strength and support over its entire area while floating in the water.

Another object of the invention is to provide a platform, adapted to float on the water, which will be both light in weight and foldable and thus capable of being transported on land in a folded condition.

A related specific object is to provide an improved, light weight, floatable platform consisting of a plurality of peripheral sections hingedly connected to a central section for folding, and, when in folded position, having the folded sections also serving to provide mutual reinforcements adding sufficient structural rigidity to the folded assembly to enable the same to be transported on land as a reinforced and conveniently movable unit.

A further object of the invention is to provide a floating foldable platform with novel means capable of serving as a footway from the platform to the shore when the platform is floating and also to serve as a drawbar when the platform is in folded position on land and in condition for towing.

A still further object is to provide a novel foldable and transportable platform designed as a floating platform, which will be relatively inexpensive in construction and thus adapted to have a popular appeal.

Briefly stated, the invention consists of a novel floating platform structure employing a deck supported by buoyant support means extending throughout the entire area of the deck. The platform is comprised of peripheral sections adapted to be disposed in a common plane with a central section for floating on water and being adapted to be folded into a rigid, box-like structure around said central section for transportation on land. The device has wheel means for supporting it on land and also has extendable drawbar means which serves the dual function of providing a connection between the platform and a towing vehicle and of providing a footway between the platform and the shore.

The invention will be better understood and additional objects will become apparent with reference to the following description and explanation together with the accompanying drawings.

In the drawings:

FIG. 1 is a side elevational view of the floating platform of the present invention;

FIG. 2 is a top plan view thereof;

FIG. 3 is a side elevational view of the platform in folded condition and in the process of being launched or removed from the water by a towing vehicle;

FIG. 4 is a side elevational view of the platform as arranged for movement on land;

FIG. 5 is an enlarged fragmentary plan view taken on line 5—5 of FIG. 3 showing means for holding adjacent peripheral sections in folded condition;

FIG. 6 is an enlarged fragmentary plan view of the forward portion of the platform illustrating particularly the drawbar structure and showing the drawbar in retracted position;

FIG. 7 is an enlarged fragmentary sectional view taken on the line 7—7 of FIG. 2;

FIG. 8 is an enlarged sectional view taken on the line 8—8 of FIG. 2;

FIG. 9 is an enlarged sectional view taken on the line 9—9 of FIG. 2 and showing retractable wheel structure;

FIG. 10 is a sectional view taken on the line 10—10 of FIG. 2 also showing wheel structure; and FIG. 11 is a fragmentary sectional view showing pivot means for securing the inner end of the drawbar when the drawbar is in a fully extended position.

Referring first particularly to FIG. 2, the platform of the present invention comprises a central section 12, a front section 13, a rear section 14 and a pair of side sections 15 and 16. Each of the peripheral sections 13, 14, 15 and 16 is hinged to the central section 12 by hinge means 19, the structure of which is best seen in FIG. 7, permitting upward pivotal movement of said peripheral sections relative to section 12 to form a folded, box-like structure as shown in FIGS. 3 and 4, with the section 12 as the bottom. In its preferred form, hinge 19 comprises a piano-type hinge which extends substantially the full length of the hinged joint, as apparent in FIG. 6 in connection with the front section 13, for a purpose to be described, although it is to be understood that the hinged joint may be formed of a plurality of closely spaced independent hinges rather than a single full length hinge.

The peripheral sections of the platform are adapted to be held in their folded box-like structure by suitable means such as by overlapping apertured ears or lugs 17, FIG. 5, on each folded section and adapted to receive a locking pin 18.

The construction of the platform sections is best illustrated in FIGS. 7 and 8. Each of the sections 12—16 comprises a deck 22 extending over water-tight float or pontoon members 23. As an important part of the present invention the float or pontoon members extend substantially the full length and width of the deck of each section to provide buoyant support for this deck throughout its entire area. Supports 24 are provided between the deck and the bottom of the float so that a load on the deck will be distributed over a wide area of the float. Through the use of such supports spaced only short distances apart the weight on every part of the deck is supported by the upward thrust of the water against the underlying compartment. Supports 24 preferably comprise wall portions forming individual water-tight compartments in the float, but if desired such supports may merely comprise post members spaced short distances apart. It is to be understood that the floats 23 may assume other forms, such as, for example, a plurality of individual, closely spaced float portions, or a continuous slab of buoyant material.

By the structure defined, wherein the float portions extend the full length and width of the deck sections, rather than merely comprising spaced pontoons, it will be apparent that the deck for each platform section, when the platform is afloat, has buoyant support throughout its entire area. Therefore, the deck and float portions may be of light-weight construction and yet have sufficient supporting length for the intended purpose as well as economy of manufacture.

Also, in view of the full size float structure of the present platform, a large displacement area on water is provided, and the device will have only a shallow draw in the water. Therefore, the platform can be floated in very shallow water and furthermore can be moved in close to shore to facilitate landing of its occupants.

In view of the light-weight structure of the platform and the enlarged size thereof it would not have sufficient rigidity out of water to be self-sustaining except for the added strength provided by the folding of the platform for transportation over land. With the peripheral sections 13, 14, 15 and 16 pivoted upwardly to a vertical position around the central section 12, the hinges 19 between the peripheral and central sections being full length along the hinged joints, the peripheral sections impart rigidity along the edges of the central section. In such folded, box-like condition the platform is capable of movement into and out of the water and for transportation over land.

For raising the peripheral sections 13, 14 15, and 16, winch means, FIGS. 2 and 7, may be employed comprising a shaft 28 journaled in a standard 29 and having a turning handle 30. For this purpose, suitable lines 31 are operably connected between the shaft and the respective peripheral sections and upon rotation of the shaft in a clockwise direction as viewed in FIG. 2 said sections will be raised. Lines 31 are preferably removably connected to the platform sections so as to be disconnected therefrom and placed in an out of the way position when the platform is afloat.

For transporting the device on land, the central section 12 has a pair of retractable wheel assemblies, FIGS. 9 and 10, operable in housings 34 projecting above the deck 22 of section 12. Each of these assemblies comprises a wheel 35 rotatably mounted on a stub shaft 36 having an integral rack 37 suitably mounted for vertical slidable movement in a guide channel 38. Rack 37 is driven in its vertical movement by a pinion 40 having journalled support in a wall of the channel 38 and rotated by a removable crank 41. For the purpose of anchoring the wheels in an upper retracted position or a lower extended position rack 37 has an aperture 42 adjacent its upper end which is adapted to register with upper and lower apertures 43 and 44, respectively, in the channel for receiving a locking pin 46.

The device has a drawbar or tongue member 50 which serves either as a footway from the platform to land or as a drawbar for pulling the trailer by a towing vehicle V as illustrated in FIGS. 3 and 4. Although drawbar 50 may assume various shapes it preferably comprises a box-like, water-tight rigid structure (FIGS. 7 and 8) and has a slidable mounting engagement with the central platform section 12. For this purpose, section 12 has a guideway 51 for slidably receiving the drawbar. To limit outward movement of the drawbar the latter carries a laterally extending shaft 52 projecting beyond opposite sides thereof (FIGS. 7 and 11), slidable in longitudinal slots 53 in the side walls of the guide channel 51. Slots 53 are of a sufficient length to permit retracting movement of the drawbar but terminate short of the forward end of the section 12 to limit outward movement of the drawbar.

The arrangement of the shaft 52 and slots 53 is such that the drawbar 50 in its fully extended position can pivot upwardly an amount sufficient to provide a convenient connection to the towing vehicle which may be on the bank, the inner end 54 of the drawbar being rounded to permit such pivotal movement. For connection to the towing vehicle the outer end of the drawbar carries a hitch portion, shown as a ball 55, for engagement with a suitable hitch portion on the towing vehicle.

The drawbar may be slidably extended and retracted by a winch 57, FIGS. 6 and 7, operable by a removable hand crank 58. A cable 59 is wound around the winch drum and has its opposite ends connected by means of ears 60 to opposite ends of the drawbar. For the purpose of locking the latter in its retracted FIG. 4 position for towing it has a pin receiving opening 62, FIGS. 2 and 6, adapted to register with an aperture 63 in the platform section 12 for receiving suitable locking pin means, not shown.

As best seen in FIG. 8, the front platform section 13 has a bottom-opening channel portion 65 for freely receiving the drawbar whereby this platform section may be raised and lowered without regard to the position of the drawbar.

The platform hereof may have many uses. As one use and as illustrated herein, it is particularly adaptable for use as a floating recreational device. For this purpose, the platform may have an awning 67, duly supported by corner pole members 68, and a dressing room 69. The top surface of wheel assembly housings 34 may comprise a table top 70, and suitable furniture 71 or recreational equipment may be carried thereon.

When in use in the water, the platform sections are unfolded (FIGS. 1 and 2). The device may have its own propelling means or may if desired be towed. The drawbar can be used to secure the platform next to the shore, as in FIG. 1, either by being attached to a fixed object on the shore or merely by being embedded in the shore. In addition the drawbar 50 also serves as a footway from the platform to the shore.

When it is desired to transport the platform over land, the wheels 35 are extended as in FIG. 3 and locked in such position by engagement of pin 46 in apertures 42 and 44 in the rack and channel 38 respectively. The peripheral sections of the platform are pivoted upwardly and locked in vertical position by pins 18 engageable with ears 17, the vertical sections thereby imparting rigidity to the central section 12. In the folding step awning 67 merely folds inwardly as apparent in dotted lines in FIG. 3. The drawbar is fully extended and in such position is readily pivoted for connection to the towing vehicle. After pulling the trailer to level ground the folded structure is wheeled forwardly on the drawbar and locked to the latter by pin locking means, not shown, inserted through registering apertures 62 and 63 in the drawbar and platform section 12, respectively.

It is to be understood that the form of my invention herein shown and described is to be taken as a preferred structure and that various changes in the shape, size and arrangement of parts may be resorted to without departing from the principle of the invention or the scope of the claim.

I claim:

A portable, foldable, floating platform comprising a rectangular main section, a pair of retractable wheels mounted on said main section, a pair of substantially identical rectangular side sections having the same length as said main section, hinge means connecting said side sections to said main section respectively throughout their entire length, a pair of substantially identical end sections having a width equal to the width of said main section, and hinge means connecting said end sections to said main section respectively throughout their entire width, all of said sections having top decks and buoyant support means of substantially the same depth extending under substantially their entire deck areas, said hinge means for said sections so arranged that the top decks of said sections will extend in the same plane when said platform is in normal fully extended floating position, said side sections and said end sections all extending for the same distance from said main section, and means for securing said side sections and said end sections together in upright folded right angle positions with respect to said main section so as to form a rectangular box-like structure with said main section as the base when said platform is arranged in folded position for transportation on land, whereby said side and said end sections in folded position will cooperate with said main section to enable the folded box-like structure to have necessary rigidity for land transportation.

References Cited in the file of this patent

UNITED STATES PATENTS

| | | |
|---|---|---|
| 2,495,412 | Gouge | Jan. 24, 1950 |
| 2,727,484 | White | Dec. 20, 1955 |
| 2,856,087 | Steber | Oct. 14, 1958 |
| 2,876,466 | Baldwin | Mar. 10, 1959 |

FOREIGN PATENTS

| | | |
|---|---|---|
| 955,636 | France | July 4, 1949 |
| 815,638 | Great Britain | July 1, 1959 |